(12) United States Patent
Hiszpanski et al.

(10) Patent No.: US 12,529,831 B2
(45) Date of Patent: Jan. 20, 2026

(54) DIRECTIONALLY DEPENDENT OPTICAL FEATURES APPARATUS AND METHOD

(71) Applicant: Lawrence Livermore National Security, LLC, Livermore, CA (US)

(72) Inventors: Anna M. Hiszpanski, Livermore, CA (US); Joshua D. Kuntz, Livermore, CA (US); Eric Meshot, Livermore, CA (US); Kerry G. Krauter, Livermore, CA (US); Elaine Lee, Livermore, CA (US); Andrew J. Pascall, Livermore, CA (US); Marcus A. Worsley, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 809 days.

(21) Appl. No.: 17/413,443

(22) PCT Filed: Dec. 14, 2018

(86) PCT No.: PCT/US2018/065841
§ 371 (c)(1),
(2) Date: Jun. 11, 2021

(87) PCT Pub. No.: WO2020/122952
PCT Pub. Date: Jun. 18, 2020

(65) Prior Publication Data
US 2022/0057551 A1 Feb. 24, 2022

(51) Int. Cl.
*G02B 5/18* (2006.01)
*B42D 25/324* (2014.01)
(Continued)

(52) U.S. Cl.
CPC ......... *G02B 5/1861* (2013.01); *B42D 25/324* (2014.10); *B42D 25/351* (2014.10);
(Continued)

(58) Field of Classification Search
CPC ........ G02B 5/1861; G02B 5/09; G02B 5/136; G02B 5/1809; G02B 5/0221; G02B 5/02;
(Continued)

(56) References Cited

U.S. PATENT DOCUMENTS 7,630,954 B2 * 12/2009 Adamczyk ............. B42D 25/29
156/283
9,147,845 B2 9/2015 Park et al.
(Continued)

FOREIGN PATENT DOCUMENTS

KR 20120083206 A 7/2012
WO 2011017741 A1 2/2011
(Continued)

OTHER PUBLICATIONS

Machine Translation of WO-2016188619-A1 (Year: 2016).*
(Continued)

*Primary Examiner* — William R Alexander
*Assistant Examiner* — Matthew Y Lee
(74) *Attorney, Agent, or Firm* — Perkins Coie LLP

(57) ABSTRACT

Directionally dependent optical effects are produced from faceted micrometer-scale substructures. The directionally dependent optical effects can appear as one specific color when viewed from one direction and another specific color when flipped and viewed from the opposing direction. The directionally dependent optical effects may appear reflective or transmissive from one direction and antireflective or opaque when flipped around.

24 Claims, 7 Drawing Sheets

(51) Int. Cl.
*B42D 25/351* (2014.01)
*B42D 25/373* (2014.01)
*G02B 5/09* (2006.01)
*G02B 5/136* (2006.01)

(52) U.S. Cl.
CPC ............ *B42D 25/373* (2014.10); *G02B 5/09* (2013.01); *G02B 5/136* (2013.01)

(58) Field of Classification Search
CPC .. G02B 5/0257; G02B 5/0236; G02B 5/0263; G02B 5/0284; B42D 25/324; B42D 25/351; B42D 25/373; B42D 25/36; B42D 25/328; B42D 25/29; B42D 25/30; B42D 25/333; B42D 25/40; G03H 1/0011; G03H 1/0248
See application file for complete search history.

(56) References Cited

U.S. PATENT DOCUMENTS

| | | | |
|---|---|---|---|
| 2003/0058491 | A1 | 3/2003 | Holmes et al. |
| 2008/0231976 | A1* | 9/2008 | Commander ............. B44F 1/10 359/833 |
| 2009/0061217 | A1 | 3/2009 | Silva et al. |
| 2010/0230615 | A1* | 9/2010 | MacPherson ............ G02B 5/18 359/290 |
| 2012/0228860 | A1* | 9/2012 | Rauch ................. B42D 25/324 283/85 |
| 2013/0301131 | A1 | 11/2013 | Schnieper et al. |
| 2014/0016207 | A1* | 1/2014 | Char ..................... G02B 5/045 359/625 |
| 2015/0103405 | A1* | 4/2015 | Corbelli ............... G02B 5/1861 252/514 |
| 2015/0224809 | A1 | 8/2015 | Tompkin et al. |
| 2016/0299270 | A1* | 10/2016 | Kotov .................. G02B 5/1861 |
| 2017/0276614 | A1* | 9/2017 | Bovero ............. G01N 21/8851 |
| 2019/0039401 | A1* | 2/2019 | Minamikawa ....... B42D 25/351 |
| 2021/0268826 | A1* | 9/2021 | Yashiki ................ B42D 25/328 |

FOREIGN PATENT DOCUMENTS

| | | | | |
|---|---|---|---|---|
| WO | WO-2014019558 | A1 * | 2/2014 | ............ B42D 25/29 |
| WO | WO-2016188619 | A1 * | 12/2016 | ........... B42D 25/328 |
| WO | 2017033027 | A1 | 3/2017 | |

OTHER PUBLICATIONS

De Nicola, Francesco, et al., "Moth-eye effect in hierarchical carbon nanotube anti-reflective coatings," Carbon 108, 262-267, 2016.

Diaz Leon, Juan J., et al., "Design Rules for Tailoring Antireflection Properties of Hierarchical Optical Structures," Advanced Optical Materials 5, 1700080, 2017.

International Search Report and Written Opinion mailed Sep. 11, 2019 for International Patent Application No. PCT/US2018/065841.

Kaul, Anupama B., et al., "Ultra-High Optical Absorption Efficiency from the Ultraviolet to the Infrared Using Multi-Walled Carbon Nanotube Ensembles," Carbon Nanotubes, Small vol. 9, No. 7, 1058-1065, 2013.

Yang, Luxia, et al., "Rapid and low cost replication of complex microfluidic structures with PDMS double casting technology," Microsyst Technol 20:1933-1940, 2014.

* cited by examiner

DIRECTIONALLY DEPENDENT OPTICAL FEATURES APPARATUS AND METHOD

STATEMENT AS TO RIGHTS TO INVENTIONS MADE UNDER FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC, for the operation of Lawrence Livermore National Laboratory.

CROSS-REFERENCE TO RELATED APPLICATION

This application is a national stage of International Application No. PCT/US18/065841 filed on Dec. 14, 2018, titled DIRECTIONALLY DEPENDENT OPTICAL FEATURES APPARATUS AND METHOD, which is hereby incorporated by reference in its entirety.

BACKGROUND

Field

The present technology relates to optical features, and more specifically, it relates to faceted micrometer-scale substructures to make directionally dependent optical features.

Description of Related Art

Diffractive optically variable image devices (DOVIDs), more commonly referred to as holograms, are an attractive and widely used optical feature used for a wide-range of applications, including art, entertainment, security, data storage, and medicine. DOVIDs are typically composed of nanometer-scale features that are smaller than the wavelength of light at which they are meant to operate so that reflected light has been diffracted by the features. The diffractive nature of the reflected light means that the observed wavelength of light (i.e., color of light) is highly angle dependent, and DOVIDs typically change their apparent color, pattern, or design with small changes in the angle at which the DOVID is viewed. However, some applications require optical features that are not angle dependent and change their appearance through some other means.

SUMMARY

Diffractive optically variable image devices (DOVIDs) are optical features used for a variety of applications, including art, entertainment, security, data storage, and medicine, that produce a change in color, pattern, or design with small changes in viewing angle. Because such optical features are highly sensitive to the observer's viewing angle, attaining a specific optical effect often requires precise specification and control of the viewing angle. Rather than making angle-dependent optical features, the present technology enables faceted micrometer-scale substructures to make directionally dependent optical features. For example, in some embodiments, without specifying the precise viewing angle, the present directionally dependent optical features appear as one specific color when viewed from one direction and another specific color when flipped and viewed from the opposing direction. In another embodiment, the present directionally dependent optical features may appear reflective or transmissive from one direction and antireflective or opaque when flipped around, Such binary changes in optical properties that occur with simple actions like flipping around or stretching a feature make such designs simpler to use in a multitude of applications.

Using faceted micrometer-scale structures, the present directionally dependent optical features produce different optical effects (i.e., different colors, images, degrees of reflectivity and transmissivity) depending on the direction (as opposed to angle) with which the particular embodiment is viewed. For example, one type of optical feature produces two different colors when the feature is flipped over or rotated 180°. FIG. 1A illustrates the principle and shows a structure 10 having horizontal lines to indicate the color blue. FIG. 1B depicts the structure of FIG. 1A after it has been rotated 180°. FIG. 1B shows vertical lines to indicate the color pink. The ability to make this feature directionally dependent and decoupled from the viewing angle relies on the use of faceted structures that are larger than the target wavelength regime of interest (i.e., 400-700 nm, for visible light). When a surface is textured with features smaller than, or on the order of, the wavelength of light used to view the surface, as DOVIDs are, reflectance from the surface is predominantly specular, or mirror-like, as well as highly angle dependent. However, when a surface is textured with features larger than the wavelength of light used to view it, reflected light is scattered from the surface at a variety of angles, yielding predominantly diffuse and less angle-dependent reflectance. Thus, by using faceted structures that are larger than the wavelength regime (i.e., micrometer-scale) and by preferentially coating specific faces of the micro-structures, optical features are created that are highly directionally dependent yet simultaneously viewing angle-independent.

The technology has a large variety of uses. Example of such uses follow:
1. Anti-glare and privacy screen that is polarization independent (i.e., would work on paper);
2. Directionally-dependent absorber for sensors, photo-detectors, smart windows
3. Art/decoration to add directionally-dependent color effect to water features, statues, frames;
4. Fashion (clothing, home décor) to produce color difference depending on direction of viewer (e.g., may be used in place of color-shifting sequins, cross-dyed fabrics, or Chroma polyurethanes);
5. Eyewear coatings for fashion (different color of lenses observed depending on direction of viewer) or for practical applications (reduced reflectivity);
6. Car coatings to give appearance of different matte color depending on direction of observer (e.g., akin to ChromaFlair);
7. Toys, entertainment (stretchable color changing material; can use material to "hide" messages depending on angle of viewer); and
8. Jewelry in place of opals or other color-shifting materials.

BRIEF DESCRIPTION OF THE DRAWINGS

The accompanying drawings, which are incorporated into and form a part of the disclosure, illustrate embodiments of the technology and, together with the description, serve to explain the principles of the technology.

DETAILED DESCRIPTION OF THE TECHNOLOGY

The directionally dependent optical features of the present technology rely on micrometer-scale faceted structures where different faces of the structure can be anisotropically coated with pigments or thin films having color due to interference, thereby yielding different optical effects when viewing different faces of the micro-structures. The micro-structures are slightly larger than the visible wavelength regime (400-700 nm) in which the features are to operate, thereby yielding diffuse angle-independent reflectance and making them not detectable by eye. The number of faces on the micro-structures dictates the number of different optical effects one can achieve with one type of structure. While structures can be of varying sizes, the faces of all structures must be oriented in nearly the same direction and angle in order to produce the directionally dependent optical effects of the present technology.

Figure 1A:
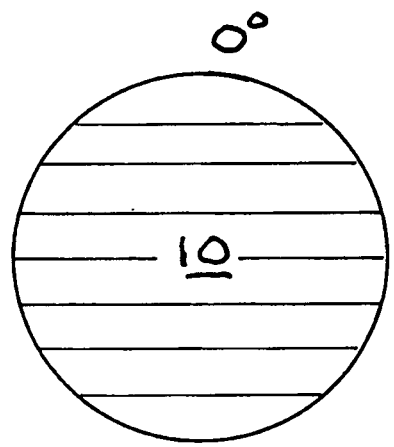
FIG. 1A illustrates an anisotropically coated micro-structure having a particular color when viewed from one direction.
Figure 1B:
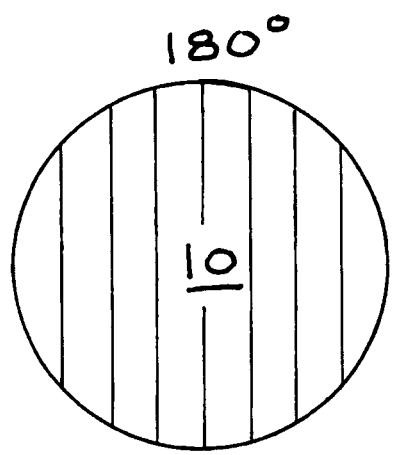
FIG. 1B illustrates a color change that is observable after the structure of FIG. 1A has been rotated 180°.
Figure 2A:
FIG. 2A is an image of silicon pyramids or hillocks formed by maskless KOH etching forming aperiodic pyramids.
Figure 2B:
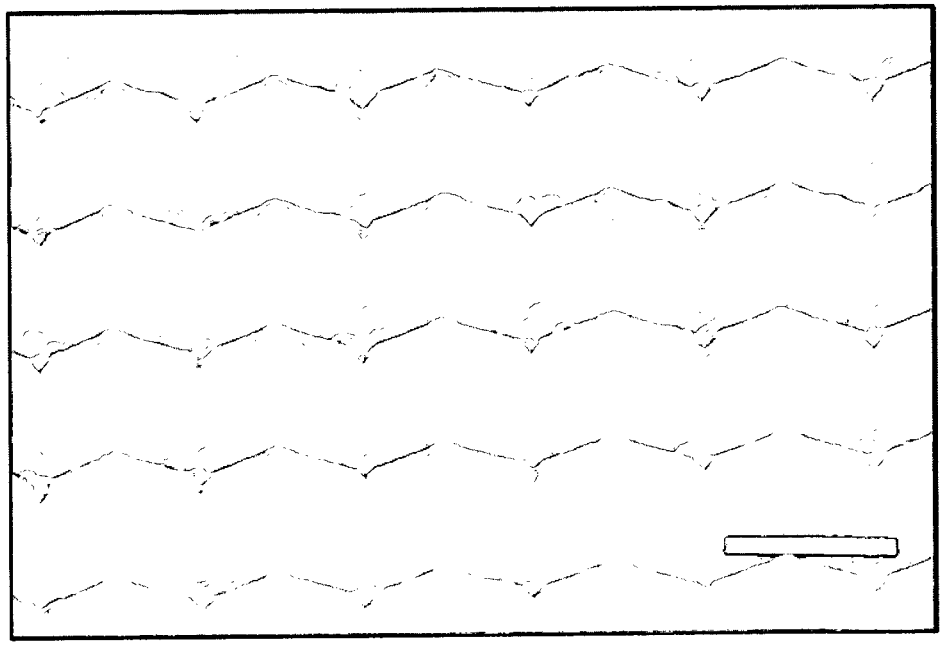
FIG. 2B is an image of periodic silicon pyramids or hillocks formed by photolithographically-patterned masks and KOH etching.
Figure 2C:
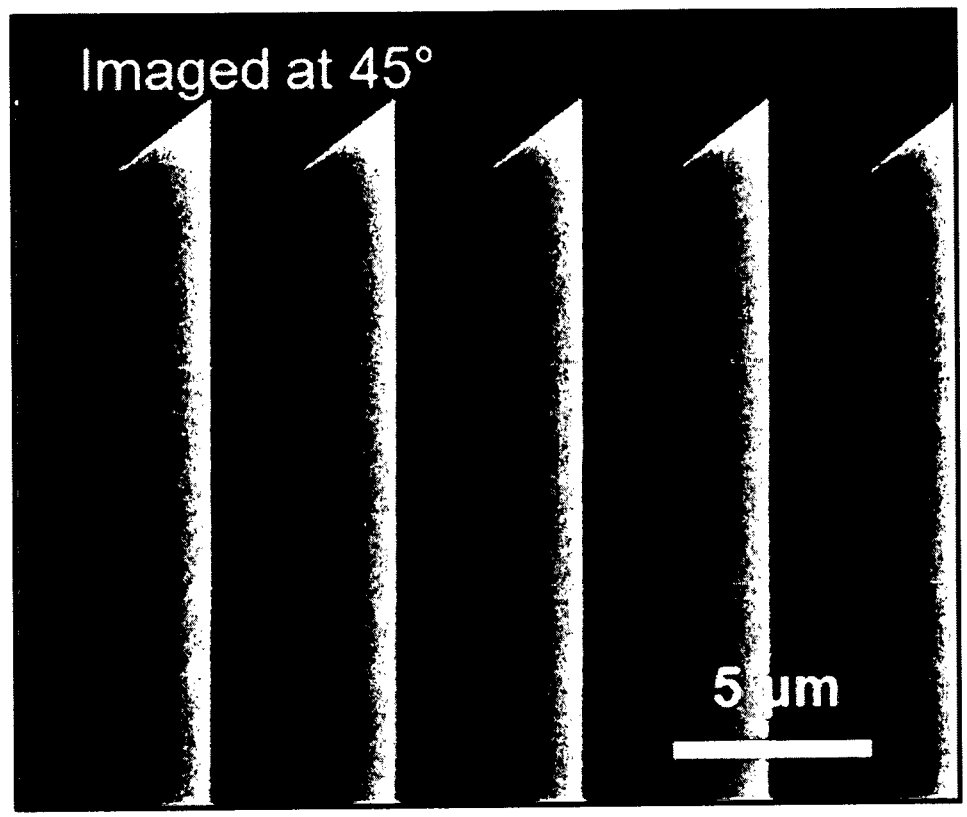
FIG. 2C is an image of periodic silicon trenches formed by photolithographically-patterned masks and KOH etching.
Figure 3A:
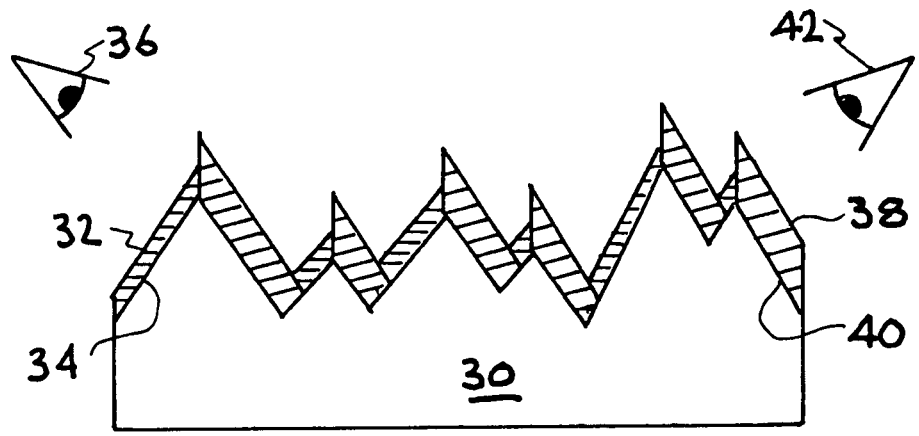
FIG. 3A shows how different faces of a faceted micrometer-scale structures can be selectively coated by utilizing line-of-sight deposition to produce two different colors depending on the viewing direction.

For large-scale applications, anisotropic crystallographic etches are ideal for creating regular faceted micrometer-scale structures. As an example, a simple maskless potassium hydroxide (KOH) etch of (100) silicon wafers produces aperiodic micrometer-scale pyramids with four faces (also referred to as hillocks), as shown in FIG. 2A, due to the differences in the etching rates along silicon's crystallographic axes. This etchant is often used in the silicon solar cells industry to reduce silicon's total reflectance from ca. 37% to 10%. By patterning a mask prior to etching, periodic pyramids can also be produced, as shown in FIG. 2B. Thus, FIG. 2B is an image of periodic silicon pyramids or hillocks formed by photolithographically-patterned masks and KOH etching. FIG. 2C is an image of periodic silicon trenches formed by photolithographically-patterned masks and KOH etching. Those skilled in the art will understand that other methods of forming structures can be used in the present technology, FIGS. 3A-3E depicts a number of different schemes that can be employed using this underlying microstructure to attain different directionally dependent optical features. For example, FIG. 3A shows how different faces of the faceted micrometer-scale structures 30 can be selectively coated by utilizing line-of-sight deposition to produce two different colors depending on the viewing direction. The coating 32 on the facets 34 facing toward view 36 produce one color and the coating 38 on the facets 40 facing view 42 produce a different color. FIG. 2C is an image of periodic silicon trenches formed by photolithographically-patterned masks and KOH etching. As a proof of principle, two different thicknesses of silicon dioxide (each <200 nm) were deposited via electron beam deposition on two opposing faces of aperiodic silicon pyramids. Silicon dioxide thin films having different thicknesses will appear to have different colors due to interference effects. Directionally dependent deposition can be achieved by mounting the macroscopic sample at an angle to the deposition source so that one face of the microstructures is parallel to the deposition source and the opposing face is hidden (i.e., shadowing effect).

Figure 3B:
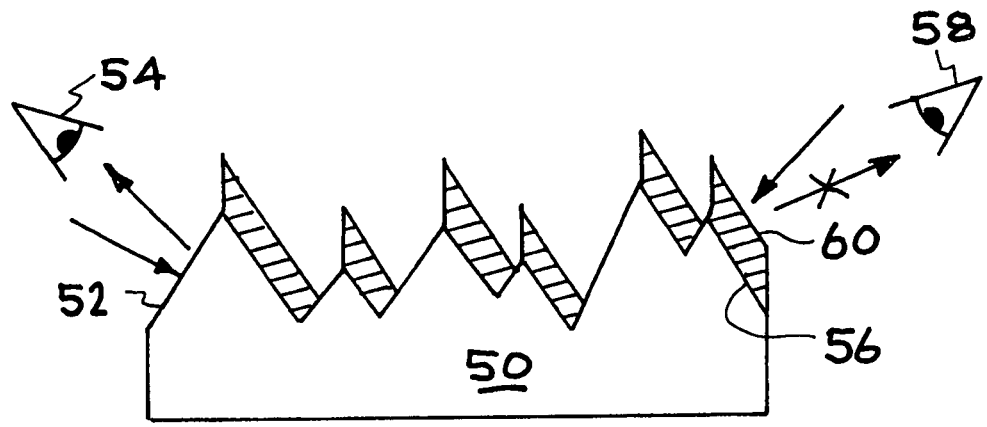
FIG. 3B shows a micrometer-scale structure where the facets facing one direction are uncoated and facets facing another direction are coated with an antireflective coating.

In addition to coating different facets of the micro-structure to produce directionally dependent color effects, materials can also be selectively deposited on one or more faces of the micro-structures to produce changes in reflectivity. FIG. 3B shows a micrometer-scale structure 50 where the facets 52 facing view 54 are uncoated. Facets 56 facing view 58 are coated, in this case, with an antireflective coating 60. In this embodiment, facets 52 are reflective and antireflective coating 60 on facets 56 is non-reflective. For example, densely packed carbon nanotube arrays are amongst the least reflective materials known and are already used on flat, unstructured substrates to enhance light absorption or photodetection. By growing carbon nanotube arrays atop micro-structures, thereby forming a hierarchical structure, the overall substrate's reflectivity is reduced even further. In some embodiments, a metal catalyst film can be selectively deposited on only one face of the silicon microstructures. Subsequently, carbon nanotube arrays can be grown on the film, which renders the substrate very black and antireflective when viewed along the face on which carbon nanotubes are grown and, conversely, highly reflective when viewed from the opposite direction. This novel means of producing anisotropic and directionally dependent optical features can be extended to other 1D nanostructure arrays beyond carbon nanotubes to produce materials with a variety of anisotropic optical properties.

Figure 3C:
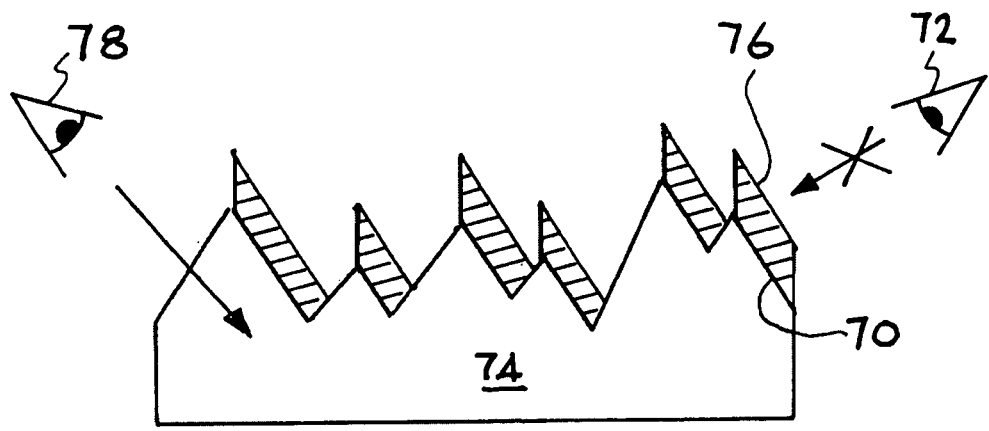
FIG. 3C shows how facets of transparent micro-structures facing one direction can be coated to be opaque so that macroscopically the material appears opaque when viewed in the coating direction and transmissive when viewed from other non-coated directions.
Figure 4A:
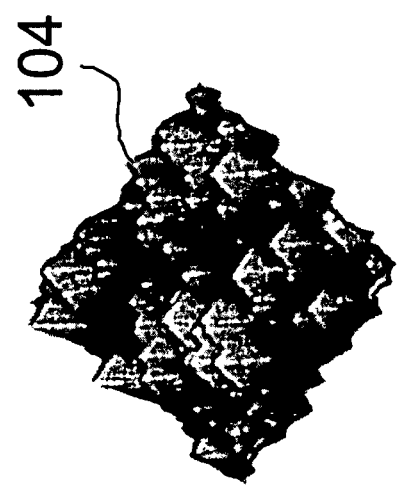
FIG. 4A-C show how multi-faceted features fabricated in silicon can be reproduced in a flexible and, if desired, transparent substrate, like polyclimethylsiloxarie (PDMS).
Figure 4B:
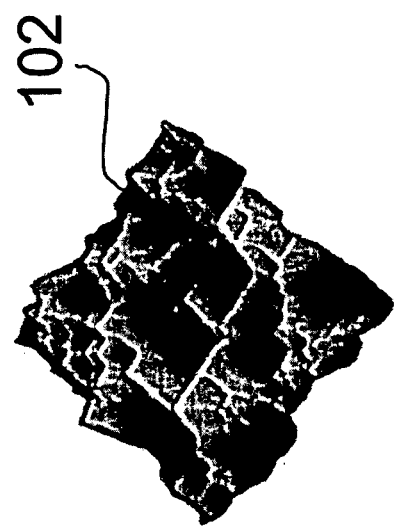
Figure 4C:
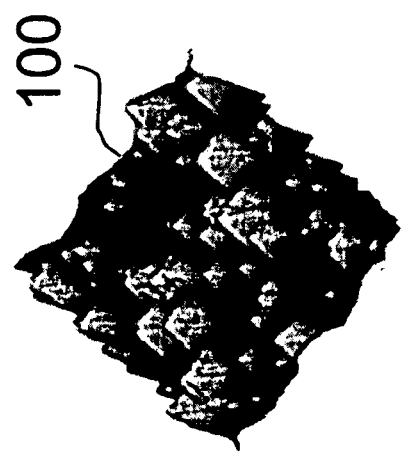

While we formed the micro-structures in silicon as an example, these micro-structures can be replicated in flexible, stretchable, and/or transparent substrates easily using prior art, as shown in FIGS. 4A-4C and discussed below. With a flexible and transparent substrate, more schemes for creating directionally dependent optical effects are possible. For example, FIG. 3C shows how facets 70 facing view 72 of transparent micro-structures 74 can be coated with a coating 76 to be opaque so that macroscopically the material appears opaque when viewed in the coating direction (view 72) and transmissive when viewed from other non-coated direction (view 78).

Figure 3D:
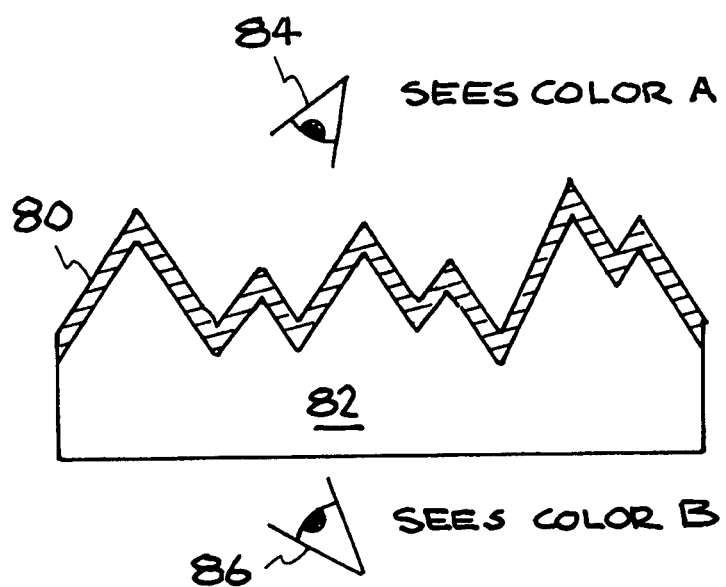
FIGS. 3D and 3E illustrate optical effects made possible when micro-structures are replicated in transparent and stretchable polymers, like poly(dimethylsiloxane).
Figure 3E:
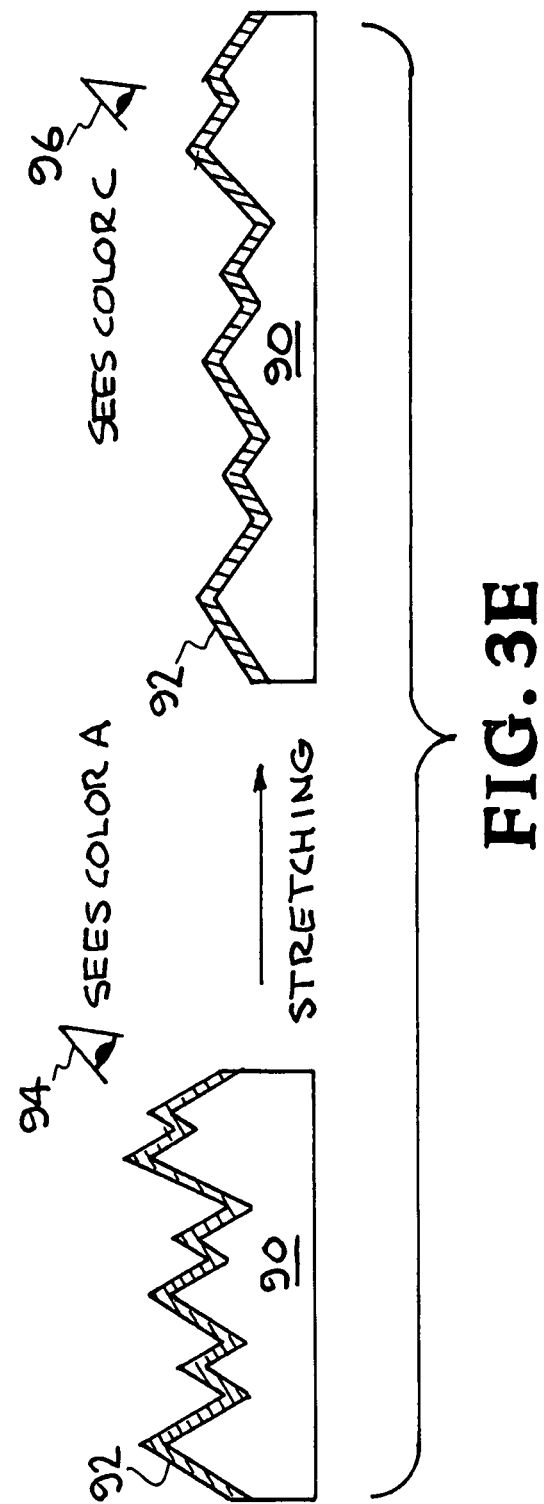

FIGS. 3D and 3E demonstrate two more optical effects possible when micro-structures are replicated in transparent and stretchable polymers, like poly(dimethylsiloxane). Rather than coating single faces of the micro-structure, the schemes of FIGS. 3D and 3E utilize conformal coating of all faces of the structure. FIG. 3D relies on a multilayer thin film 80 (on structure 82) that has been optimized to produce different colors upon reflection (view 84) and transmission (view 86). The antireflective nature of the micro-structure can be further used to enhance this effect. FIG. 3E utilizes stretching (either along one axis or two) to flatten the textured micro-structure 90, which has a conformal diffractive thin film coating 92. Flattening the microstructure would change the observer's effective viewing angle of the diffractive thin film and would simultaneously reduce diffusive reflectance and increase specular reflectance, all of which will contribute to an observed color change of the film with stretching. The left side of the figure shows a first color observed at view 94 from the thin film coating 92 of the unstretched micro-structure 90. The right side of the figure shows a second color, different from the first color, observed at view 96 from the thin film coating 92 of the stretched micro-structure 90.

FIGS. 4A-C illustrate the major steps in a process where multi-faceted features in silicon are reproduced in a flexible substrate. If desired, a transparent substrate, such as polydimethylsiloxane (PDMS), may be used. As an example, aperiodic silicon pyramids or hillocks can be formed by maskless KOH etching, as shown in FIG. 2A, These pyramids can be used to form a mold 100, as shown in FIG. 4A. A negative mold 102, as shown in FIG. 4B, is formed of the mold 100. Utilizing the negative mold 102 a replication 104 of the pyramids of FIG. 4A is formed, as shown in FIG. 4C.

Broadly, this writing discloses at least the following.

Directionally dependent optical effects are produced from faceted micrometer-scale substructures. The directionally dependent optical effects can appear as one specific color when viewed from one direction and another specific color when flipped and viewed, from the opposing direction. The directionally dependent optical effects may appear reflective or transmissive from one direction and antireflective or opaque when flipped around.

This writing also presents at least the following Concepts. Concepts:

1. A faceted structure having directionally dependent optical features, comprising:
   a first plurality of facets substantially facing a first direction, wherein said first plurality of facets includes facets having a first length dimension that is larger than a target wavelength of interest directed at said faceted structure;
   a second plurality of facets substantially facing a second direction different from said first direction, wherein said second plurality of facets includes facets having a second length dimension that is larger than said target wavelength of interest; and
   means for producing from said faceted structure at least one directionally dependent optical effect of said target wavelength of interest depending on the direction with which said faceted structure is viewed.
2. The apparatus of concepts 1, 3, 5, 6 and 840, wherein said faceted structure further comprises a third plurality of facets substantially facing in one or more additional directions that are different from said first direction and said second direction, wherein said third plurality of facets have a third length dimension that is larger than said target wavelength of interest.
3. The apparatus of concepts 1, 2, 5, 6 and 840, wherein said first plurality of facets face said first direction within a tolerance of plus or minus 8% in any given direction and wherein said second plurality of facets face said second direction within a tolerance of plus or minus 8% in any given direction.
4. The apparatus of concept 2, wherein said third plurality of facets face said one of more directions within a tolerance of plus or minus 8% in any given direction.
5. The apparatus of concepts 1-3, 6 and 840, wherein said target wavelength of interest is less than 750 nm.
6. The apparatus of concepts 1-3, 5 and 840, wherein said at least one directionally dependent optical feature is selected from the group consisting of color, image, degree of reflectivity and degree of transmissivity.
7. The apparatus of concept 2, wherein said at least one directionally dependent optical feature is selected from the group consisting of color, image, degree of reflectivity and degree of transmissivity.
8. The apparatus of concepts 1-3, 5, 6, 9 and 10, wherein said means for producing at least one directionally dependent optical effect comprises a first coating on said first plurality of facets and a second coating on said second plurality of facets, wherein said first coating has a first thickness and wherein said second coating has a second thickness that is different from said first thickness.
9. The apparatus of concepts 1-3, 5, 6, 8 and 10, wherein said means for producing at least one directionally dependent optical effect comprises a coating on said first plurality of facets and no coating on said second plurality of facets.
10. The apparatus of concepts 1-3, 5, 6, 8 and 9, wherein said means for producing at least one directionally dependent optical effect comprises a conformal coating on both said first plurality of facets and said second plurality of facets.
11. The apparatus of concept 10, wherein said conformal coating comprises a multilayer thin film.
12. The apparatus of concept 10, wherein said faceted structure comprises a material that is stretchable,
13. A method, comprising;
providing a faceted structure having directionally dependent optical features, comprising:
a first plurality of facets substantially facing a first direction, wherein said first plurality of facets includes facets having a first length dimension that is larger than a target wavelength of interest directed at said faceted structure;
a second plurality of facets substantially facing a second direction different from said first direction, wherein said second plurality of facets includes facets having a second length dimension that is larger than said target wavelength of interest; and
means for producing from said faceted structure at least one directionally dependent optical effect of said target wavelength of interest depending on the direction with which said faceted structure is viewed; and
directing said target wavelength of interest at said faceted structure.
14. The method of concepts 13, 15, 17, 18 and 20-22, wherein said faceted structure further comprises a third plurality of facets substantially facing in one or more additional directions that are different from said first direction and said second direction, wherein said third plurality of facets have a third length dimension that is larger than said target wavelength of interest,
15. The method of concepts 13, 14, 17, 18 and 20-22, wherein said first plurality of facets face said first direction within a tolerance of plus or minus 8% in any given direction and wherein said second plurality of facets face said second direction within a tolerance of plus or minus 8% in any given direction.

16. The method of concepts 14, wherein said third plurality of facets face said one of more directions within a tolerance of plus or minus 8% in any given direction.

17. The method of concepts 13-15, 18 and 20-22, wherein said target wavelength of interest is at least 750 nm.

18. The method of concepts 13-15, 17 and 20-22, wherein said at least one directionally dependent optical feature is selected from the group consisting of color, image, degree of reflectivity and degree of transmissivity.

19. The method of concepts 14, wherein said at least one directionally dependent optical feature is selected from the group consisting of color, image, degree of reflectivity and degree of transmissivity.

20. The method of concepts 13-15, 17, 18, 21 and 22, wherein said means for producing at least one directionally dependent optical effect comprises a first coating on said first plurality of facets and a second coating on said second plurality of facets, wherein said first coating has a first thickness and wherein said second coating has a second thickness that is different from said first thickness.

21. The method of concepts 13-15, 17, 18, 20 and 22, wherein said means for producing at least one directionally dependent optical effect comprises a coating on said first plurality of facets and no coating on said second plurality of facets.

22. The method of concepts 13-15, 17, 18, 20 and 21, wherein said means for producing at least one directionally dependent optical effect comprises a conformal coating on both said first plurality of facets and said second plurality of facets.

23. The method of concept 22, wherein said conformal coating comprises a multilayer thin film.

24. The method of concept 22, wherein said faceted structure comprises a material that is stretchable, said method further comprising stretching said faceted structure.

All elements, parts and steps described herein are preferably included. It is to be understood that any of these elements, parts and steps may be replaced by other elements, parts and steps or deleted altogether as will be obvious to those skilled in the art.

The foregoing description has been presented for purposes of illustration and description and is not intended to be exhaustive or to limit the technology to the precise form disclosed. Many modifications and variations are possible in light of the above teaching. The embodiments disclosed are meant only to explain the principles of the technology and its practical application to thereby enable others skilled in the art to best use the technology in various embodiments and with various modifications suited to the particular use contemplated. The scope of the technology is to be defined by the following claims.

We claim:

1. An apparatus comprising a faceted structure having directionally dependent optical features, comprising:
    a first plurality of facets substantially facing a first direction, wherein said first plurality of facets includes facets having a first length dimension that is larger than a target wavelength of interest directed at said faceted structure;
    a second plurality of facets substantially facing a second direction different from said first direction, wherein said second plurality of facets includes facets having a second length dimension that is larger than said target wavelength of interest; and
    means for producing, from said faceted structure, at least one directionally dependent optical effect of said target wavelength of interest that (a) depends on a direction from which said faceted structure is viewed and (b) is independent of a precise specification or control of a viewing angle from which said faceted structure is viewed from said direction, regardless of whether said direction is said first direction or said second direction, wherein said faceted structure is stretchable to flatten said faceted structure and cause a change in the at least one directionally dependent optical effect.

2. The apparatus of claim 1, wherein said faceted structure further comprises a third plurality of facets substantially facing in one or more additional directions that are different from said first direction and said second direction, wherein said third plurality of facets have a third length dimension that is larger than said target wavelength of interest.

3. The apparatus of claim 2, wherein said third plurality of facets face said one or more additional directions within a tolerance of plus or minus 8% in any given direction.

4. The apparatus of claim 2, wherein said at least one directionally dependent optical effect includes a color, an image, a degree of reflectivity, or a degree of transmissivity.

5. The apparatus of claim 1, wherein said first plurality of facets face said first direction within a tolerance of plus or minus 8% in any given direction and wherein said second plurality of facets face said second direction within a tolerance of plus or minus 8% in any given direction.

6. The apparatus of claim 1, wherein said target wavelength of interest is less than 750 nm.

7. The apparatus of claim 1, wherein said at least one directionally dependent optical effect includes a color, an image, a degree of reflectivity, or a degree of transmissivity.

8. The apparatus of claim 1, wherein said means for producing said at least one directionally dependent optical effect comprises a first coating on said first plurality of facets and a second coating on said second plurality of facets, wherein said first coating has a first thickness and wherein said second coating has a second thickness that is different from said first thickness.

9. The apparatus of claim 1, wherein said means for producing said at least one directionally dependent optical effect comprises a coating on said first plurality of facets and no coating on said second plurality of facets.

10. The apparatus of claim 1, wherein said means for producing said at least one directionally dependent optical effect comprises a conformal coating on both said first plurality of facets and said second plurality of facets.

11. The apparatus of claim 10, wherein said conformal coating comprises a multilayer thin film.

12. The apparatus of claim 1, wherein said faceted structure comprises a hierarchical structure including densely packed carbon nanotube arrays grown on at least one of said first plurality of facets or said second plurality of facets.

13. A method, comprising;
    providing a faceted structure having directionally dependent optical features, comprising:
        a first plurality of facets substantially facing a first direction, wherein said first plurality of facets includes facets having a first length dimension that is larger than a target wavelength of interest directed at said faceted structure;
        a second plurality of facets substantially facing a second direction different from said first direction, wherein said second plurality of facets includes facets having a second length dimension that is larger than said target wavelength of interest; and means for producing from said faceted structure at least one directionally dependent optical effect of said target wavelength of interest that (a) depends on a direction from which said faceted structure is viewed and (b) is independent of a precise specification or control of a viewing angle from which said faceted structure is viewed from said direction, regardless of whether said direction is said first direction or said second direction, wherein said faceted structure is stretchable to flatten said faceted structure and cause a change in the at least one directionally dependent optical effect; and directing said target wavelength of interest at said faceted structure.

14. The method of claim 13, wherein said faceted structure further comprises a third plurality of facets substantially facing in one or more additional directions that are different from said first direction and said second direction, wherein said third plurality of facets have a third length dimension that is larger than said target wavelength of interest.

15. The method of claim 14, wherein said third plurality of facets face said one or more additional directions within a tolerance of plus or minus 8% in any given direction.

16. The method of claim 14, wherein said at least one directionally dependent optical effect includes a color, an image, a degree of reflectivity or a degree of transmissivity.

17. The method of claim 13, wherein said first plurality of facets face said first direction within a tolerance of plus or minus 8% in any given direction and wherein said second plurality of facets face said second direction within a tolerance of plus or minus 8% in any given direction.

18. The method of claim 13, wherein said target wavelength of interest is at least 750 nm.

19. The method of claim 13, wherein said at least one directionally dependent optical effect includes a color, an image, a degree of reflectivity or a degree of transmissivity.

20. The method of claim 13, wherein said means for producing said at least one directionally dependent optical effect comprises a first coating on said first plurality of facets and a second coating on said second plurality of facets, wherein said first coating has a first thickness and wherein said second coating has a second thickness that is different from said first thickness.

21. The method of claim 13, wherein said means for producing said at least one directionally dependent optical effect comprises a coating on said first plurality of facets and no coating on said second plurality of facets.

22. The method of claim 13, wherein said means for producing said at least one directionally dependent optical effect comprises a conformal coating on both said first plurality of facets and said second plurality of facets.

23. The method of claim 22, wherein said conformal coating comprises a multilayer thin film.

24. The method of claim 13, wherein said faceted structure comprises a hierarchical structure including densely packed carbon nanotube arrays grown on at least one of said first plurality of facets or said second plurality of facets.

* * * * *